United States Patent Office 2,776,639
Patented Jan. 8, 1957

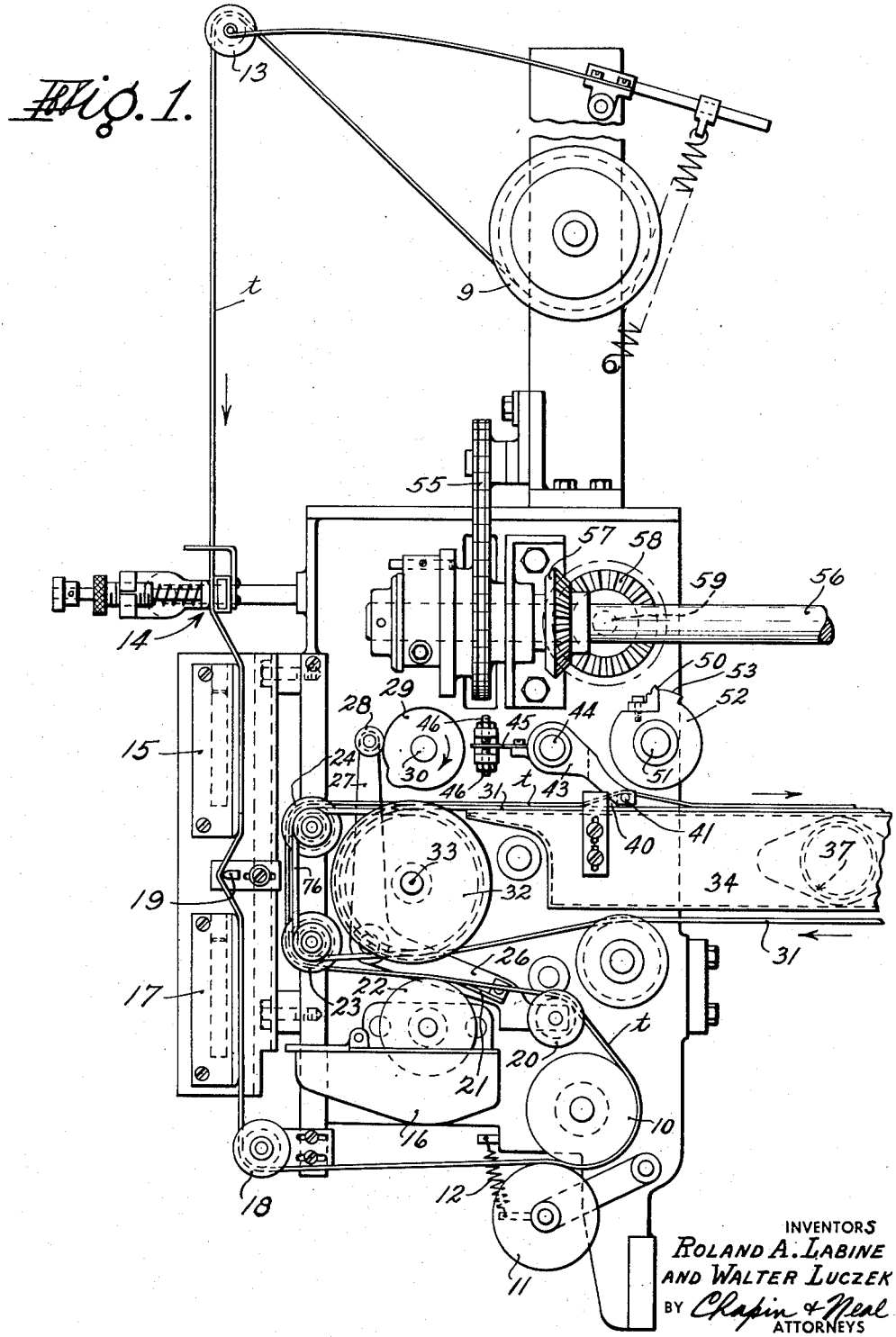

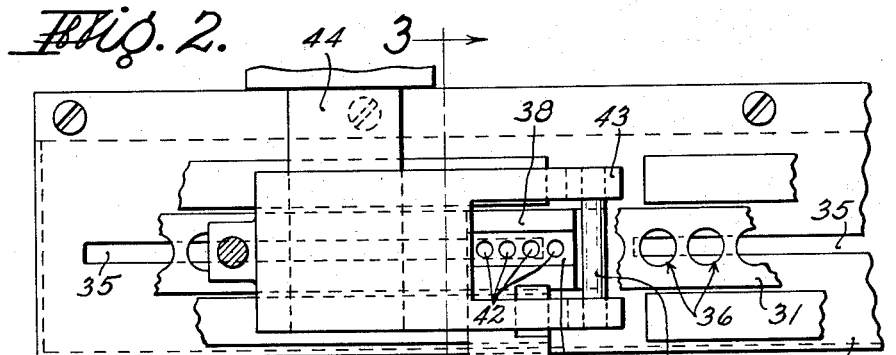
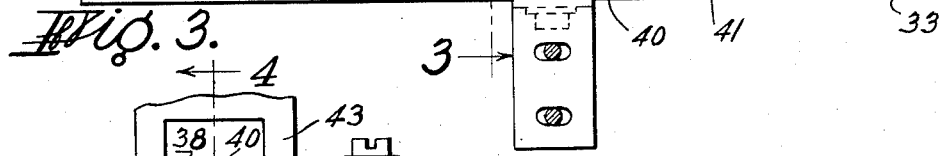
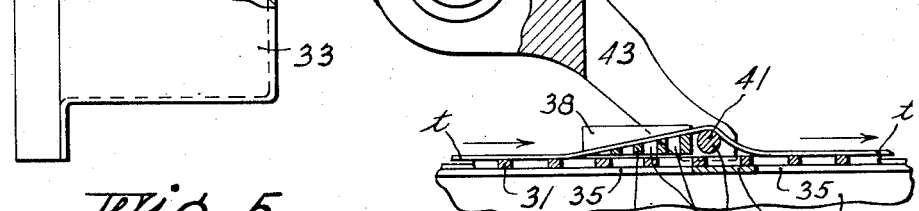
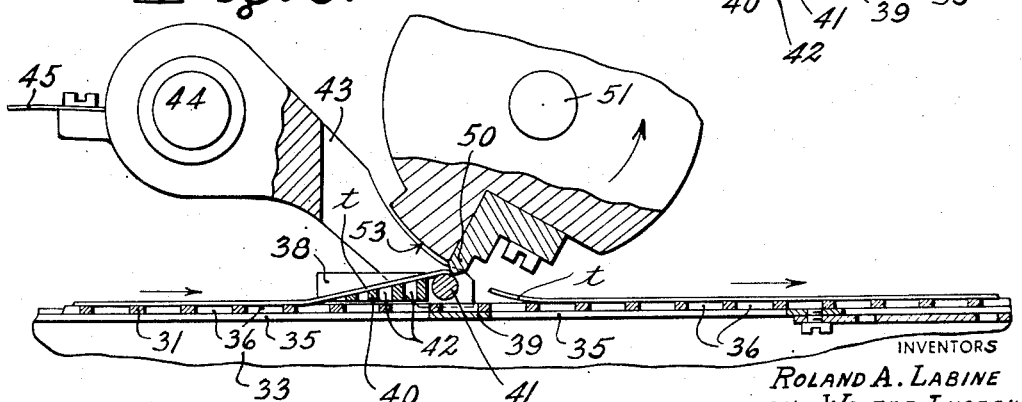

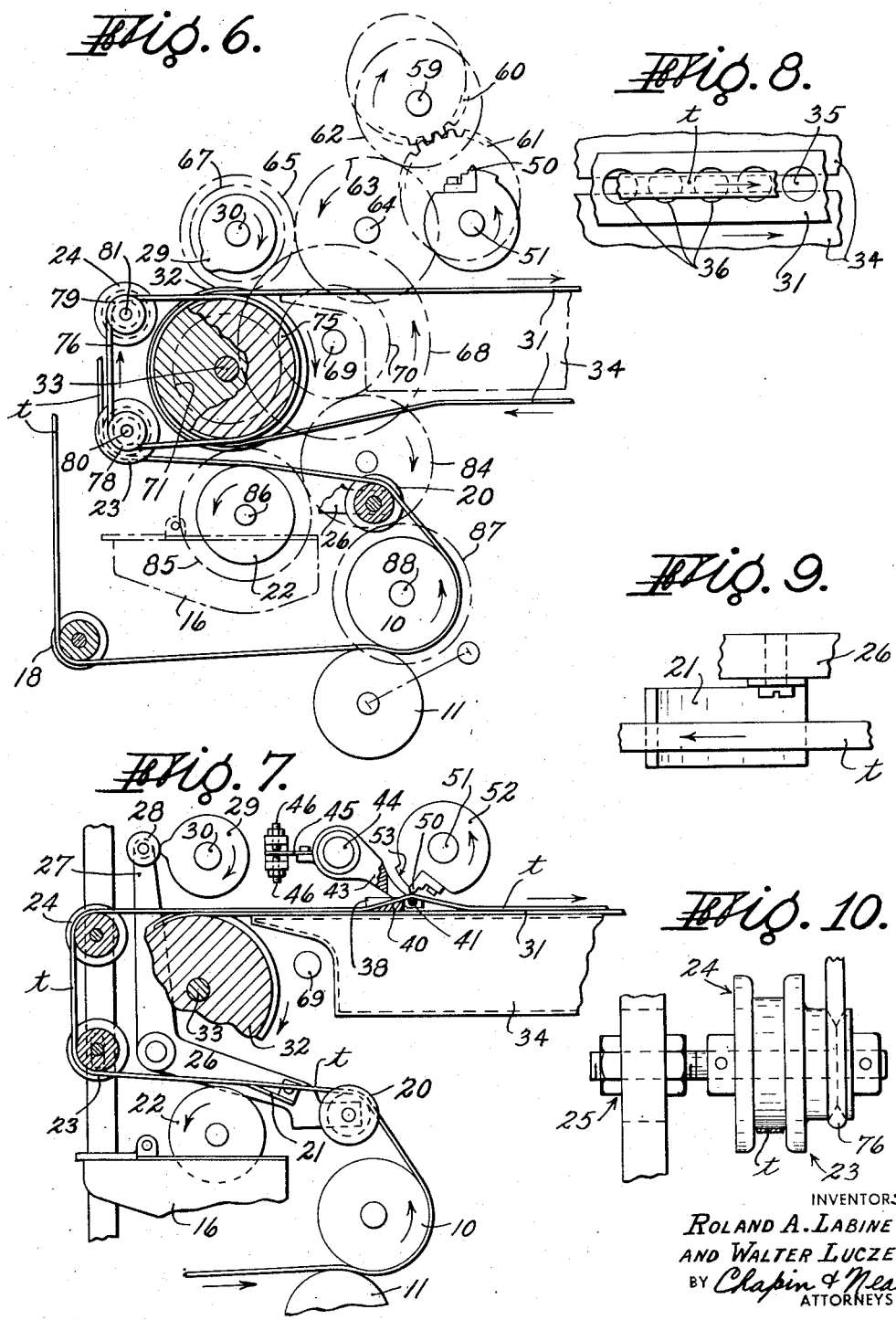

2,776,639

TEAR TAB FEEDING, GUMMING, AND CUTTING MECHANISM

Roland A. Labine, Springfield, and Walter Luczek, Indian Orchard, Mass., assignors to Package Machinery Company, East Longmeadow, Mass., a corporation of Massachusetts Application April 26, 1954, Serial No. 425,552

5 Claims. (Cl. 118—41)

This invention relates to a machine for applying so-called tearing strips transversely of the web of a wrapping material as the latter is fed to a wrapping machine.

More particularly it relates to an improved means for severing desired length of tape from a web of tape, and for controlling the tape during severance.

A machine of the type to which the invention relates is shown in detail in co-pending application Serial No. 331,665, filed January 16, 1953.

The principal object of the present invention is to provide a more accurate and dependable means for supporting and severing the tape into desired lengths than those presently available.

Other and further objects residing in the details of the structure will be made apparent in the following specification and claims.

In the accompanying drawings,

Fig. 1 is a side elevational view of a machine embodying the invention;

Fig. 2 is a detail plan view, on a larger scale, of the means for supporting the tape web during severing;

Fig. 3 is a detail sectional view substantially on line 3—3 of Fig. 2;

Fig. 4 is an enlarged detail section taken on line 4—4 of Fig. 3 showing the mechanism for lifting the tape from the conveyor belt during cutting;

Fig. 5 is a view similar to Fig. 4 but showing the parts in a different position;

Fig. 6 is a detail view showing the driving mechanism for the cutter, tape advancing belt and the tape feeding mechanism;

Fig. 7 is a similar view showing the mechanism for lifting the tape from the adhesive applying roll;

Fig. 8 is a detail view showing the manner in which the tape is held to the suction belt;

Fig. 9 is a detail view showing the mechanism for lifting the tape from the adhesive applying roll; and Fig. 10 is a detail view of one of the tape guiding rolls.

Referring to Fig. 1 the tape *t* is shown as drawn from a suitable supply roll 9 by a pair of feeding rolls 10 and 11. Roll 10 is positively driven as later described and roll 11 is pressed toward roll 10 by a suitable spring indicated at 12. In its passage from supply roll 9 the tape *t* passes over a spring supported roll 13, through a tape tensioning device generally indicated at 14 and over successive heating and smoothing plates 15 and 17 around an adjustable guide roll 18 and through the drawing rolls 10 and 11. Between the heating plates 15 and 17 which remove the tendency to twist, the tape passes over a straight edge 19 which removes the tendency to curl from the tape. From the drawing rolls 10 and 11 the tape passes over a guide roll 20 and a lifting plate 21 to, and over, an adhesive applying roll 22 from which it passes around driven guide rolls 23 and 24. Roll 24 is adjustably mounted as indicated at 25 (Fig. 10). Roll 22 constantly rotates to pick up adhesive from a suitable reservoir 16. Guide roll 20 and lifting plate 21 are carried by one arm 26 of a bell crank, the other arm 27 of which carries a cam roll 28 engaging a cam 29 secured to a shaft 30. A perforated belt 31 is trained around suitable spaced pulleys one of which is shown at 32, fixed to a constantly driven shaft 33 driven as later described. The upper run of belt 31 travels over the upper surface of a suction box 34, the upper surface of which is provided with successive slots 35, Fig. 2, which are of slightly less width than the diameter of the perforations 36 in the belt 31. Suction is applied to box 34 from any suitable source through an opening 37 in the side of the suction box. As the tape *t* leaves the guide roll 24 it is brought into contact with the suction belt 31, the uncoated side of the tape being in contact with the belt. As the tape *t* travels with belt 31 over the surface of suction box 34 it passes over a ramp 40, cut in a block 38, which lifts a portion of the tape from the belt, and then over a pin 41.

As best shown in Figs. 2, 4 and 5 the ramp 40 is provided with a plurality of openings 42 which overlie the openings in the belt and provide suction to the tape as the latter passes over the ramp. Pin 41 is carried by an arm 43 pivoted to the frame at 44 and held in adjusted position by a spring 45, one end of which is fixed to the arm 43, the other end being held between adjustable stops 46. The bell crank 26—27 is periodically rocked by its cam 29 to lift roll 20 and plate 21 upwardly to raise the tape out of contact with the adhesive applying roll 22, thus leaving successive spaced portions of tape *t* free of adhesive. As these uncoated portions of the tape pass over the pin 41 they are engaged by a knife 50 carried by a hub 52 fixed to a constantly rotating shaft 51 by which the tape is separated into lengths of desired dimensions. Spring 45 provides a yielding contact between the knife 50 and pin 41 against which the tape is cut. The knife 50 is followed by an arcuate surface 53 formed on hub 52 which engages the cut end of the tape against the pin 41 to feed and direct the cut end downwardly and again into contact with the perforated belt. Preferably, and as shown in Fig. 8, the perforations 36 are of slightly greater diameter than the width of the tape, the latter being slightly wider than slots 35. The air entering at the sides of the tape tending to maintain the tape in proper alignment.

As shown in Figs. 4 and 5 the portion 39 of suction box 34 intermediate the ends of slots 35 underlies pin 41 so that the tape as it passes over pin 41 is relieved of direct suction and any tendency to be snubbed about the pin.

By the arrangement and structure described the tape where it is separated from the perforated belt 31 is controlled by suction through ramp 40 substantially up to the point of cutting, and the leading end of the tape from which a length has been cut is immediately engaged by surface 53 and directed downwardly into the influence of the suction belt.

Referring to Fig. 1 a sprocket chain 55 driven from the wrapping machine (not shown) drives a shaft 56 which carries a beveled gear 57 meshing with a beveled gear 58 fixed to a shaft 59.

Referring to Fig. 6 shaft 59 is provided with an elliptical gear 60 which meshes with an elliptical gear 61 fixed to the shaft 51 of the cutter 50. Shaft 59 also carries a gear 62 meshing with a gear 63 carried by intermediate shaft 64. Gear 63 meshes with a gear 65 fixed to the shaft 30 which carries cam 29, previously described. Shaft 30 carries a second gear 67 which meshes with a gear 68 fixed to a shaft 69, the latter shaft carrying a second gear 70 which meshes with a gear 71 fixed to shaft 33 of the belt pulley 32. Shaft 33 carries a pulley 75 which drives a belt 76 passing around pulleys 78 and 79 carried respectively by the shafts 80 and 81 of wheels 23 and 24 previously described, to drive the latter. Previously mentioned gear 70 also drives a gear 84 which in turn meshes with a gear 85 fixed to the shaft 86 of adhesive roll 22 and with a gear 87 fixed to the shaft 88 of tape drawing roll 10.

The feed of the belt 31 during one cycle of operation of the machine is greater than the measured length of tape $t$, causing the uncut portion of the tape to drag on the belt resulting in tension on the tape. The ratio of the pulleys 75, 78 and 79, which drive wheels 23 and 24 through belt 76, is such that the peripheral speed of wheels 23 and 24 is greater than the feed of the belt 31. In effect the tape is snubbed around 90° of arc of the wheels 23 and 24 and the over drive of these wheels increases the tension on the tape as it passes over adhesive wheel 22. This increased tension helps to overcome any tendency of the tape to cling to the adhesive wheel which tendency resists lifting of the tape from the wheel by member 21. With the arrangement just described it is possible to use adhesives with high initial tack resulting in a more positive and reliable transfer of the tape length to the wrapper web, at the same time that a more accurate placement and measure of the adhesive free areas of the tape are obtained.

What is claimed is:

1. In a machine for severing predetermined lengths of tearing tape from a web of tape and advancing said severed lengths, a suction box having a slot along one side thereof, said slot being of less width than the tape, a belt traveling over said box and slot lengthwise thereof, said belt being of greater width than the slot and tape, the belt being provided with a succession of perforations of slightly greater diameter than the width of the tape, means to feed the forward end of a web of tape into contact with the belt and in overlying relation with the perforations in the belt, an adhesive applying roll over which the web passes prior to its engagement with the belt, said roll being positioned to apply adhesive to that side of the web opposite the side engaging the belt, means to drive the belt at a slightly greater speed than the web feed to apply tension to the web as it passes over the adhesive applying roll, means to periodically lift the web from the adhesive applying roll to leave spaced areas of the web free of adhesive, separating means positioned between the belt and web forwardly of the point of initial engagement of the web with the belt to separate a portion of the web from the belt, said last-named means including a cutting platen, a cutting blade and means to bring said blade into cutting relation with the platen, as the adhesive free portion of the web passes over the platen, to sever the preceding portion of the tape from the web.

2. In a machine for severing predetermined lengths of tearing tape from a web of tape and advancing said severed lengths, a suction box having a slot along one side thereof, a belt traveling over said box and slot lengthwise thereof, said belt being of greater width than the slot, the belt being provided with a succession of perforations, means to feed the forward end of a web of tape into contact with the belt and in overlying relation with the perforations in the belt, an adhesive applying roll over which the web passes prior to its engagement with the belt, said roll being positioned to apply adhesive to that side of the web opposite the side engaging the belt, means to drive the belt at a slightly greater speed than the web feed to apply tension to the web as it passes over the adhesive applying roll, means to periodically lift the web from the adhesive applying roll to leave spaced areas of the web free of adhesive, a wheel positioned between the adhesive applying roll and the point of contact of the web with the belt and making a snubbing engagement with the web, and means to drive said wheel at a surface speed in excess of the speed of the belt to enhance the tension imposed on the web as the latter passes over the adhesive roll, separating means positioned between the belt and web forwardly of the point of initial engagement of the web with the belt to separate a portion of the web from the belt, said last-named means including a cutting platen, a cutting blade and means to bring said blade into cutting relation with the platen, as the adhesive free portion of the web passes over the platen, to sever the preceding portion of the tape from the web.

3. In a machine for severing predetermined lengths of tearing tape from a web of tape and advancing said severed lengths, a suction box having a slot along one side thereof, a belt traveling over said box and slot lengthwise thereof, said belt being of greater width than the slot, the belt being provided with a succession of perforations, means to feed the forward end of a web of tape into contact with the belt and in overlying relation with the perforations in the belt, an adhesive applying roll over which the web passes prior to its engagement with the belt, said roll being positioned to apply adhesive to that side of the web opposite the side engaging the belt, means to drive the belt at a slightly greater speed than the web feed to apply tension to the web as it passes over the adhesive applying roll, means to periodically lift the web from the adhesive applying roll to leave spaced areas of the web free of adhesive, separating means positioned between the belt and web forwardly of the point of initial engagement of the web with the belt to separate a portion of the web from the belt, said last-named means comprising an inclined ramp having perforations communicating with the perforations in the belt to apply suction to the web as the latter passes over the ramp, a cutting platen positioned forwardly of the ramp and over which the web passes, a cutting blade and means to bring said blade into cutting relation with the platen, as the adhesive free portion of the web passes over the platen, to sever the preceding portion of the tape from the web.

4. In a machine for severing predetermined lengths of tearing tape from a web of tape and advancing said severed lengths, a suction box having a slot along one side thereof, a belt traveling over said box and slot lengthwise thereof, said belt being of greater width than the slot, the belt being provided with a succession of perforations, means to feed the forward end of a web of tape into contact with the belt and in overlying relation with the perforations in the belt, an adhesive applying roll over which the web passes prior to its engagement with the belt, said roll being positioned to apply adhesive to that side of the web opposite the side engaging the belt, means to drive the belt at a slightly greater speed than the web feed to apply tension to the web as it passes over the adhesive applying roll, means to periodically lift the web from the adhesive applying roll to leave spaced areas of the web free of adhesive, a wheel positioned between the adhesive applying roll and the point of contact of the web with the belt and making a snubbing engagement with the web, and means to drive said wheel at a surface speed in excess of the speed of the belt to enhance the tension imposed on the web as the latter passes over the adhesive roll, separating means positioned between the belt and web forwardly of the point of initial engagement of the web with the belt to separate a portion of the web from the belt, said last-named means comprising an inclined ramp having perforations communicating with the perforations in the belt to apply suction to the web as the latter passes over the ramp, a yieldingly mounted pin positioned forwardly of the ramp and over which the web passes as it leaves the ramp, said pin forming a cutting platen, a cutting blade and means to bring said blade into cutting relation with the pin, as the adhesive free portion of the web passes over the pin, to sever the preceding portion of the tape from the web.

5. A machine as in claim 4 in which the slot in the suction box is closed beneath the pin to free the web from suction at the time of severance of the web.

References Cited in the file of this patent

UNITED STATES PATENTS

| | | |
|---|---|---|
| 1,617,013 | Denmire | Feb. 8, 1927 |
| 1,619,079 | Leguillon | Mar. 1, 1927 |
| 2,165,289 | Milmoe et al. | July 11, 1939 |
| 2,276,745 | Smith | Mar. 17, 1942 |
| 2,524,945 | Von Hofe | Oct. 10, 1950 |